S. P. LOVE & J. E. PARKER.
MOLDING MACHINE.
APPLICATION FILED JAN. 19, 1912.

1,049,112.

Patented Dec. 31, 1912.
2 SHEETS—SHEET 2.

Witnesses

Inventors
Samuel P. Love
John E. Parker

By Victor J. Evans
Attorney

UNITED STATES PATENT OFFICE.

SAMUEL POE LOVE AND JOHN EDWIN PARKER, OF TRENTON, MISSOURI; SAID PARKER ASSIGNOR TO SAID LOVE.

MOLDING-MACHINE.

1,049,112. Specification of Letters Patent. Patented Dec. 31, 1912.

Application filed January 19, 1912. Serial No. 672,127.

*To all whom it may concern:*

Be it known that we, SAMUEL P. LOVE and JOHN E. PARKER, citizens of the United States, residing at Trenton, in the county of Grundy and State of Missouri, have invented new and useful Improvements in Molding-Machines, of which the following is a specification.

An object of the invention is to provide a molding machine for molding structures, such as tanks and the like from plastic materials.

The invention embodies more particularly a machine for use in connection with concrete for molding the same to form structures, such as tanks and silos.

For the purpose mentioned, use is made of a main post on which is slidably mounted a frame provided with extensible members having a mold dependingly mounted thereon and means for elevating the mentioned frame on the mentioned post, the said mold when in initial position being adapted to receive a quantity of plastic material, the said mold being then elevated a distance on the said post to receive a second batch of plastic material, after which the mold is again raised a distance on the post so that the mold in being elevated each time to receive a new batch of material acts as a continuous mold to mold the plastic material the form of the desired structure.

Reference is to be had to the accompanying drawings constituting a part of this specification, in which similar characters of reference denote corresponding parts in all the views, and in which—

Figure 1:
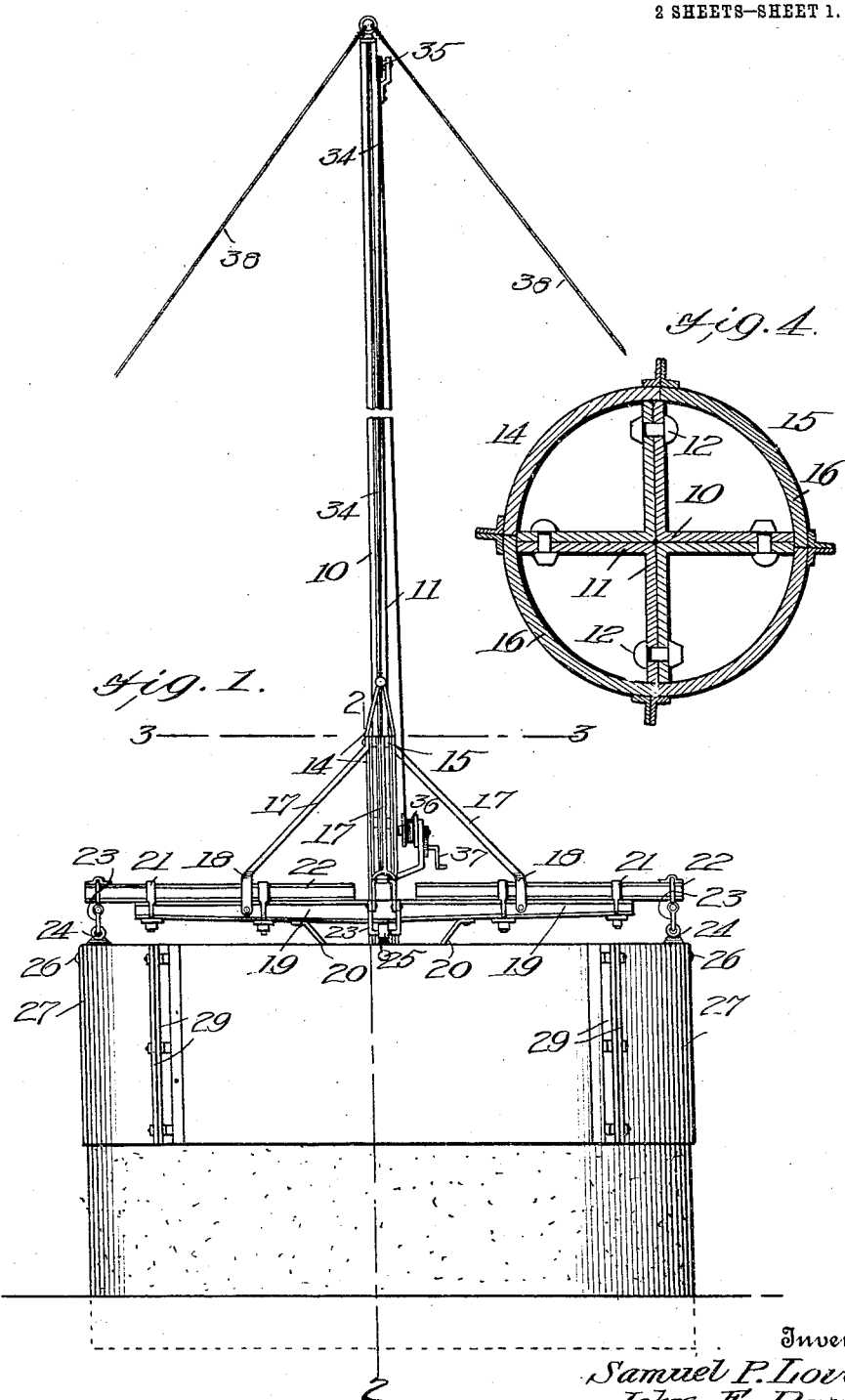
Figure 2:
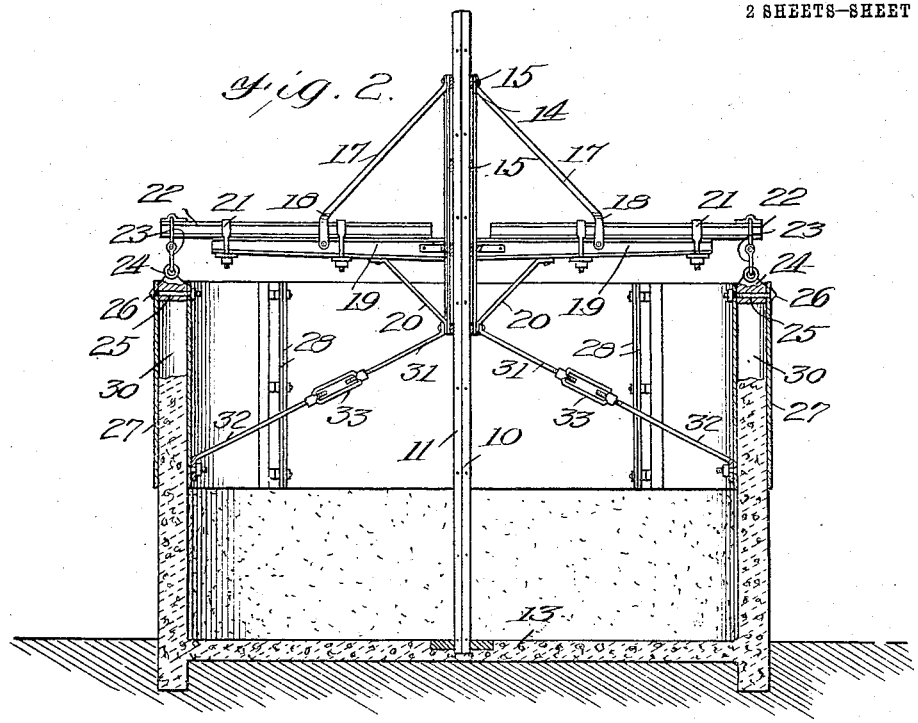
Figure 3:
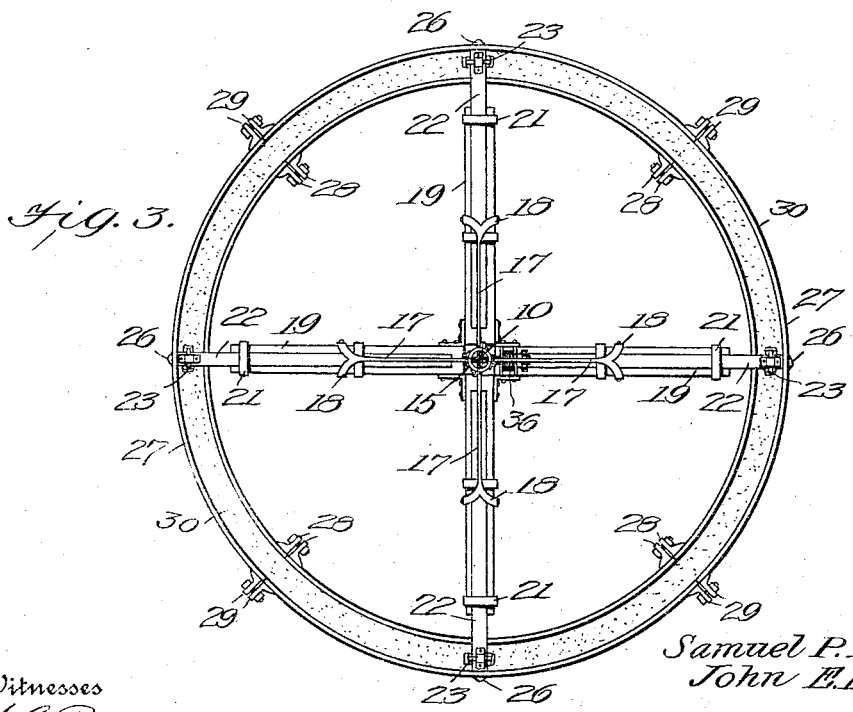

Figure 1 is a side elevation of our device showing the same in operative position. Fig. 2 is a vertical sectional view taken on the line 2—2 in Fig. 1. Fig. 3 is a horizontal sectional view taken on the line 3—3 in Fig. 1, looking in the direction of the arrow. Fig. 4 is an enlarged transverse sectional view of the center post, showing the sleeve of the frame encircling the same.

Referring more particularly to the views, we provide a center post 10 consisting of connected L-shaped rods 11, the mentioned L-shaped rods being secured by rivets 12 and the lower end of the post being adapted to be received in the ground or in a concrete base 13 as shown in Fig. 2. Slidably mounted on the post 10 is a frame 14 consisting of a circular sleeve 15, formed of connected sections 16 and secured to the upper end of the sleeve 15 and extending outwardly and downwardly therefrom are supporting rods 17 having their lower ends 18 bifurcated and secured to radially extending guide rods 19, suitable braces 20 being secured to the lower end of the sleeve 15 and to the guide rods 19 to support the same in horizontal position. Secured to the guide rods 19 are guides 21 and mounted to slide on the guide rods 19 and retained thereon by the guides 21 are extensible rods 22. Link members 23 are mounted on the outer ends of the rods 22 and dependingly mounted on the link members 23 are heads 24 provided with horizontal openings 25 through which are removably extended bolts 26 for securing mold sections 27 to the heads 24, two mold sections being preferably provided for each head and termed inner mold sections and outer mold sections, the inner mold sections being spaced from the outer mold sections, the ends of the rear mold sections being connected to the ends of adjacent inner mold sections by flanges 28 provided with suitable bolts and the ends of the outer mold sections being connected to the ends of adjacent outer mold sections by flanges 29 provided with suitable bolts to form a circular mold 30. Secured to the lower end of the sleeve 15 are rods 31 and secured to the lower ends of the inner mold sections are similar rods 32, the free ends of the rods 31 and 32 being threaded for engagement with turn buckles 33, thus permitting an adjustment of the rods 31 and 32, the mentioned adjustment being coincident with the extensibility of the rods 22.

Although we desire to employ any convenient mechanism for elevating the frame 14 on the main post 10, for the purpose of fully describing the operation of our device we have shown a particular method of elevating the frame and in which we employ a cable 34 having an end thereof secured to the frame 14, the mentioned cable being then passed over a pulley 35 mounted on the upper end of the post 10 with the other end of the cable secured to a windlass 36, operable by means of a crank 37 and mounted on the frame 14, guy ropes 38 being secured to the upper end of the post 10 and to stakes secured in the ground for the purpose of retaining the post in vertical position.

Now assuming that the extensible rods 22 have been adjusted on the guide rods 19 to properly support the mold sections 27, when the frame 14 is in its lowermost position, with the lower ends of the mold sections touching the ground or a suitable base, a batch of concrete or the like is poured into the mold 30 between the inner and outer mold sections, after which the batch of concrete is properly tamped. The crank 37 is then actuated to operate the windlass 36 and elevate the frame 14 on the post 10 so that the lower ends of the mold sections will slightly overlap the finished portion of the structure, after which a new batch of concrete is poured between the inner and outer mold sections and tamped, thus forming another portion of the structure, the frame 14 being then raised a greater distance on the post 10 to permit of pouring a third batch of concrete between the inner and outer mold sections. In this manner the entire concrete structure can be formed, it being understood that the main post 10 is of sufficient height to enable the operator to raise the frame 14 to its uppermost position, this position being the upper end of the desired concrete structure. By employing mold sections of various sizes and adjusting the extensible rods 22 and rods 31, 32 in accordance to the sizes of the mold sections, concrete structures of greater or less diameters can be conveniently molded with the device described it being understood that the mold sections can be removed from engagement with the heads 24 by removing the bolts 26 from the openings 25 in the heads 24.

Having thus fully described the invention, what we claim as new, is:—

1. In a molding machine, the combination with a post, of a sleeve carried thereby, radial guide rods extended from the said sleeve, supporting rods on the sleeve and connected to the guide rods to support the same in horizontal position, guides on the said guide rods, extensible rods movable in the said guides, link members on the said extensible rods, heads supported by the said link members, and connected mold sections mounted to depend from the said head.

2. In a molding machine, the combination with a post, of a sleeve carried thereby, guide rods extending from the said sleeve and movable therewith, bifurcated rods connected to the sleeve and the said guide rods to support the same in horizontal position, extensible rods mounted to slide on the said guide rods, link members on the said extensible rods, heads supported by the said link members, and connected mold sections mounted to depend from the said heads.

In testimony whereof we affix our signatures in presence of two witnesses.

SAMUEL POE LOVE.
JOHN EDWIN PARKER.

Witnesses:
PLATT HUBBELL,
BERNICE GILLULY.

Copies of this patent may be obtained for five cents each, by addressing the "Commissioner of Patents, Washington, D. C."